(12) United States Patent
Burton et al.

(10) Patent No.: US 7,116,041 B2
(45) Date of Patent: Oct. 3, 2006

(54) SPARK ELECTRODE ASSEMBLY

(75) Inventors: Robert L. Burton, Maumee, OH (US); D. Wayne Leidy, Perrysburg, OH (US); Garrett L. Scott, Toledo, OH (US); Thomas W. White, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 172 days.

(21) Appl. No.: 10/855,830

(22) Filed: May 27, 2004

(65) Prior Publication Data

US 2005/0264154 A1 Dec. 1, 2005

(51) Int. Cl.
*H01T 13/00* (2006.01)
*H01T 13/02* (2006.01)
*H01T 13/20* (2006.01)

(52) U.S. Cl. ............... 313/143; 313/118; 313/120; 313/127; 313/141; 313/142; 123/169 EL; 123/169 R

(58) Field of Classification Search ........... 313/143, 313/141–142, 120; 123/169 R, 169 EL
See application file for complete search history.

(56) References Cited

U.S. PATENT DOCUMENTS

| | | | |
|---|---|---|---|
| 3,141,752 A | 7/1964 | Keller | |
| 3,417,276 A | 12/1968 | Szilagyi | |
| 3,480,442 A | 11/1969 | Lichok et al. | |
| 3,981,711 A | 9/1976 | Bjorkstrom | |
| 4,315,298 A | 2/1982 | Mulkins et al. | |
| 4,412,974 A | 11/1983 | Nicolas et al. | |
| 4,498,918 A | 2/1985 | Seeman | |
| 4,648,893 A | 3/1987 | Roux | |
| 4,691,136 A | 9/1987 | Schmidt | |
| 4,806,137 A | 2/1989 | Virey | |
| 5,006,321 A | 4/1991 | Dorfman et al. | |
| 5,120,341 A | 6/1992 | Nozawa et al. | |
| RE34,785 E | 11/1994 | Virey | |
| 5,679,409 A | 10/1997 | Seeman | |
| 5,746,800 A | 5/1998 | Ambrogio | |
| 5,958,099 A | 9/1999 | Morettin | |
| 6,015,322 A | 1/2000 | White et al. | |
| 6,068,889 A | 5/2000 | Seeman | |
| 2001/0035028 A1 | 11/2001 | Seeman et al. | |
| 2003/0175424 A1 | 9/2003 | Seeman | |
| 2003/0221455 A1 | 12/2003 | Scott et al. | |

FOREIGN PATENT DOCUMENTS

| | | |
|---|---|---|
| EP | 0 393 554 | 10/1990 |
| EP | 1 369 396 | 12/2003 |
| GB | 492 069 | 9/1938 |
| JP | 61-007583 | 1/1986 |
| JP | 01-292779 | 11/1989 |
| JP | 07-022153 | 1/1995 |

*Primary Examiner*—Joseph Williams
*Assistant Examiner*—Natalie K. Walford

(57) ABSTRACT

A spark electrode assembly has an elongate electrode with an inner insulator arranged for operable attachment to a support structure. The inner insulator surrounds the electrode with one end of the electrode positioned adjacent a ground element across a spark gap and another end of the electrode extending relative to the support structure for attachment to a source of electrical power. An outer insulator is spaced radially outwardly from the inner insulator and surrounds the inner insulator generally adjacent the end of the electrode adjacent the ground element. The inner and outer insulators cooperate to inhibit the formation of a continuous lubrication layer thereon, thereby establishing an area generally free from the lubrication layer between the end of the electrode adjacent the ground element and the support structure.

12 Claims, 2 Drawing Sheets

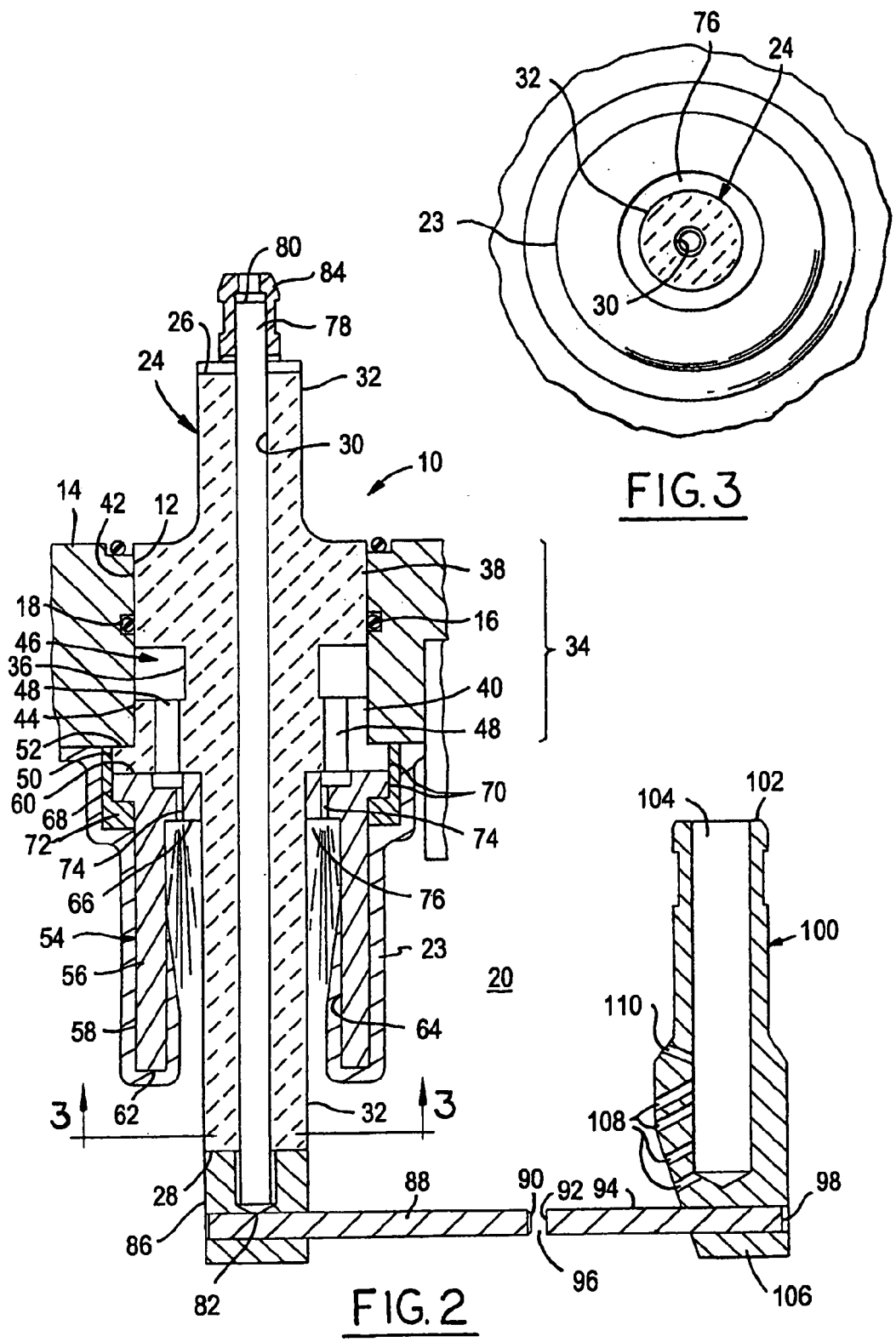

SPARK ELECTRODE ASSEMBLY

FIELD OF THE INVENTION

This invention relates generally to forming glassware, and more particularly to lubricating glass forming molds.

BACKGROUND OF THE INVENTION

It is known to lubricate a glassware forming mold by igniting a carbonaceous gas with a spark electrode to deposit a thin layer of carbon soot in the mold. To ignite the gas, the spark electrode creates a spark across a gap between an electrode and a ground element. In use, the carbon soot builds up along the electrode, and particularly on an insulative coating around the electrode. Over time, an electrical path created by the carbon build up along the insulative coating establishes a path of least resistance through which electrical energy passes preventing the generation of a spark at the spark gap. Ultimately, this results in a failure to ignite the combustible gas and hence, failure to lubricate the glass contacting surface of the glass mold with the carbon soot.

SUMMARY OF THE INVENTION

A spark electrode assembly is provided for igniting a combustible gas to lubricate a glassware mold surface. The spark electrode assembly has an electrode with an inner insulator surrounding the electrode at least in part to facilitate mounting the electrode to a support structure. One end of the electrode is disposed on one side of the support structure for connection to a source of electrical power, and another end of the electrode is positioned adjacent a ground element across a spark gap. An outer insulator is spaced at least in part from the inner insulator and surrounds the inner insulator generally adjacent the end of the electrode adjacent the ground element.

In use, the spark electrode assembly generates a spark across the gap defined between the electrode and the ground element to ignite a combustible gas within a glassware mold. The ignited combustible gas deposits a lubrication layer on the glassware mold surface. The inner and outer insulators cooperate to inhibit the lubrication layer from forming completely and over a continuous path thereon, thereby maintaining an area generally free from the lubrication layer between the end of the electrode adjacent the ground element and the support structure. As a result, electrical leakage from the electrode to the support element is inhibited by causing an interruption in any potential electrical path between the electrode and the support structure. Accordingly, the integrity of the spark between the electrode and the ground element is maintained to increase the useful life of the spark electrode assembly.

BRIEF DESCRIPTION OF THE DRAWINGS

These and other objects, features, advantages and aspects of the present invention will be apparent from the following detailed description of the preferred embodiments and best mode, appended claims and accompanying drawings in which:

FIG. 2 is a similar view as FIG. 1 showing a layer of deposited material from the combustible gas coating a portion of the spark electrode assembly with an air stream inhibiting the build-up of the layer, and FIG. 3 is a sectional view taken generally along line 3—3 of FIG. 2.

DETAILED DESCRIPTION OF THE PREFERRED EMBODIMENTS

Figure 1:
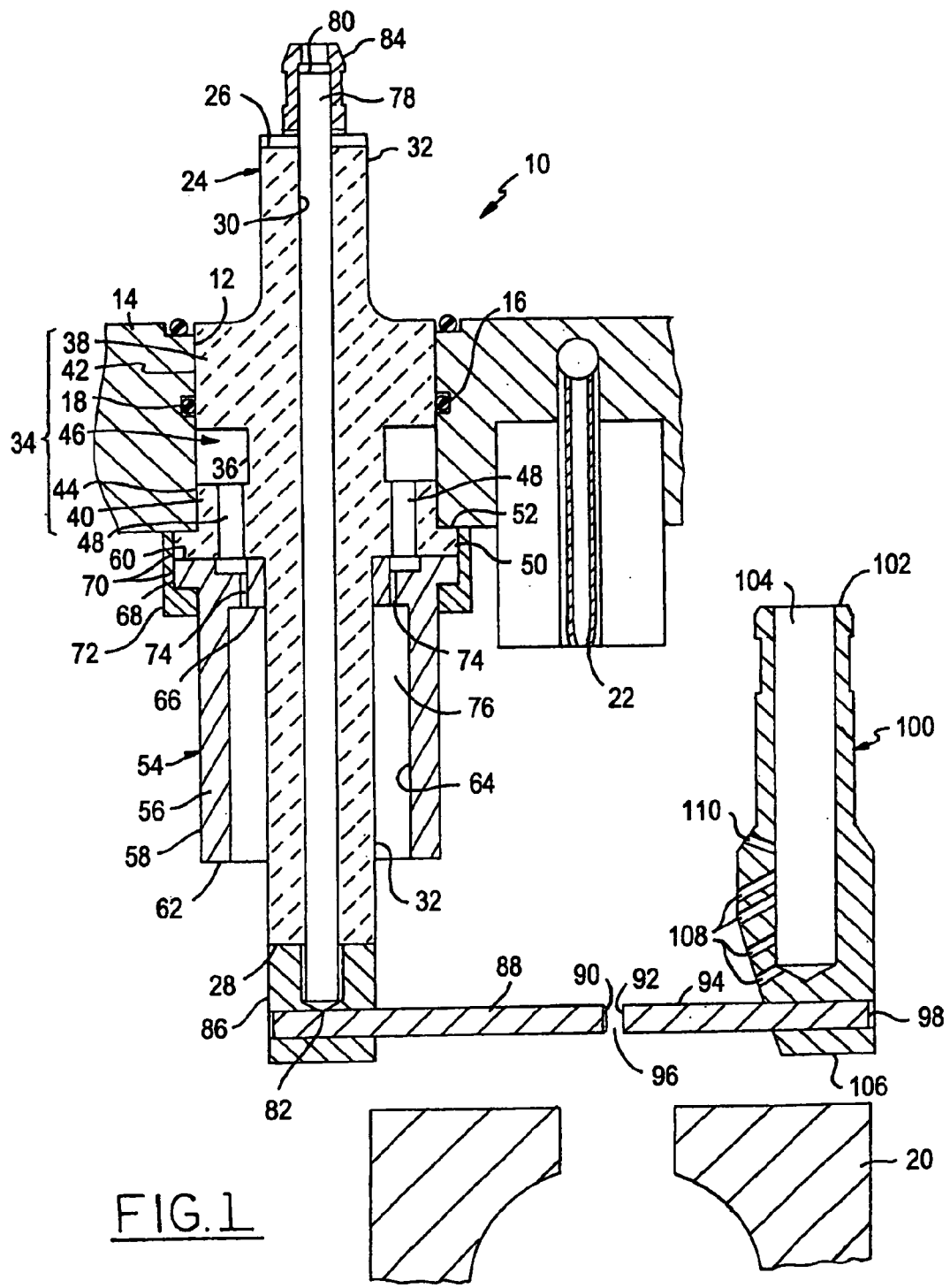
FIG. 1 is a partial cross-sectional view of a glass molding assembly showing a spark electrode assembly constructed according to one embodiment of the invention for igniting a combustible gas within the glass molding assembly.

Referring in more detail to the drawings, FIG. 1 illustrates a spark electrode assembly 10 constructed according to one aspect of the invention received in an opening 12 of a support structure or housing 14 of a glass mold (not shown in detail). To facilitate an airtight seal between the spark electrode assembly 10 and the housing 14, desirably the housing 14 has an annular recess 16 sized for receipt of a seal 18, such as an O-ring. The spark electrode assembly 10 produces a spark upon receiving an electrical impulse from an electrical power source (not shown) to ignite a combustible gas within a cavity 20 of the glass mold, preferably a carbon-containing gas such as acetylene, that is preferably delivered via a nozzle 22. The nozzle 22 is arranged to deliver an oxidant, such as pure oxygen, in addition to the combustible gas, wherein the mixture of the oxidant and the gas provides for the desired amount of carbon deposit on a glassware mold surface within the glass mold. In addition to the glassware mold surface at least a portion of the spark electrode assembly 10 is generally contacted by or covered by a thin layer of carbon deposit or residue 23 (FIG. 2). The spark electrode assembly 10 resists the formation or buildup of a continuous layer of the carbon residue thereon, thereby resisting electrical leakage and the formation of a short circuit between the spark electrode apparatus 10 and the housing 14. As such, the spark electrode assembly 10 operates over extended periods of time without requiring maintenance, such as cleaning or replacement, operates at an optimal efficiency, and inhibits or prevents misfires.

As shown in FIGS. 1 and 2, the spark electrode assembly 10 has an inner insulator 24 with opposed ends 26, 28 and an inner passage 30 extending between the ends 26, 28. The inner insulator 24 has a generally cylindrical outer surface 32 with an enlarged mid-section 34 extending radially outwardly from the outer surface 32. The mid-section 34 has an annular groove 36 extending radially inwardly therein defining a pair of axially spaced upper and lower portions 38, 40 having outer surfaces 42, 44, respectively, preferably sized for receipt within the opening 12 of the housing 14. Desirably, to facilitate locating the inner insulator 24 within the opening 12 of the housing 14, a flange 50 extends radially outwardly from the lower portion 40 to define a shoulder 52 for engagement with the housing 14. The inner insulator 24 has an air passage 46 communicating with a source of pressurized air (not shown). The air passage 46 is formed in part by the annular groove 36 and by a plurality of ports 48 extending axially through the lower portion 40 of the mid-section 34, with the ports 48 preferably being spaced circumferentially and equidistant from one another.

The spark electrode assembly 10 has an outer insulator 54 generally surrounding the inner insulator 24. The outer insulator 54 has a generally cylindrical wall 56 with an outer surface 58 extending generally between opposed ends 60, 62 and an inner surface 64 spaced radially outwardly at least in part from the outer surface 32 of the inner insulator 24, wherein the inner surface 64 extends generally from the end 62 axially toward the other end 60 to a radially inwardly extending shoulder 66. Desirably, the outer insulator 54 has a-flange 68 extending radially outwardly adjacent or at the end 60 for mating engagement with the flange 50 of the inner insulator 24. Desirably, the flanges 50, 68 establish a uniform cylindrical outer surface 70 when engaged with one another for receipt of a generally annular retainer 72 that captures the flanges 50, 68 and secures the outer insulator 54 to the inner insulator 24. By way of examples without limitations, the retainer 72 may be threaded to the outer surface 70 of the shoulders 50, 68, or the retainer 72 may be attached to or carried by the housing 14.

The outer insulator 54 has a plurality of air passages 74 preferably corresponding in number and arrangement to the ports 48 in the inner insulator 24. As such, when the outer insulator 54 is attached to the inner insulator 24, the ports 48 and the air passages 74 are in at least partial axial alignment with one another to establish an air flow path there between. The air passages 74 in the outer insulator 54 communicate with a space or gap 76 defined between the inner surface 64 of the outer insulator 54 and the outer surface 32 of the inner insulator 24.

An electrode 78 is sized for receipt in the inner passage 30 of the inner insulator 24 and desirably extends beyond the ends 26, 28 of the inner insulator 24 to a pair of opposite ends 80, 82. Desirably, the end 80 is sized for receipt of an electrode terminal 84, wherein for example, the terminal 84 may be crimped on the end 80 to facilitate attachment of an electrical cable or wire (not shown) to the spark electrode assembly 10. The end 82 is preferably sized for receipt of an electrode cap 86, wherein for example, the electrode cap 86 may be crimped on the end 82 to facilitate attachment of an electrode extension 88. The electrode extension 88 extends generally perpendicularly from the electrode 78 to a generally free end 90. The free end 90 is spaced a predetermined distance from a free end 92 of a ground element 94 to define a gap 96 therebetween.

The ground element 94 has another end 98 preferably attached to an air purge nozzle 100. The air purge nozzle 100 has an end 102 operably attached to a source of pressurized air (not shown), and may be the same source of pressurized air directing air flow through the air passage 46 in the inner insulator 24 and the air passages 74 in the outer insulator 54. The air purge nozzle 100 has an air passage 104 extending axially therethrough and terminating adjacent an end 106 of the air purge nozzle 100. Desirably, the air purge nozzle 100 has a plurality of ports 108 oriented to direct air flow outwardly from the air passage 104 and toward the electrode extension 88 and the ground element 94. Further, the air purge nozzle 100 preferably has at least one additional port 110 oriented to direct air flow generally upwardly toward the nozzle 22. Accordingly, pressurized air is directed through the ports 108, 110 to facilitate removal of any deposits, such as carbon buildup, that may otherwise accumulate on the nozzle 22, the electrode extension 88 and the ground element 94. The removal of the carbon buildup helps to ensure that an adequately sized spark arcs across the gap 96, as desired.

To further ensure that the spark electrode assembly 10 does not misfire, the outer insulator 54 and the inner insulator 24 cooperate to resist carbon build-up between the electrode extension 88 and the housing 14. By resisting such carbon build-up, an electrical short circuit is inhibited from forming, thereby promoting the flow of electricity from the electrode extension 88 to the ground element 94 across the gap 96. As shown in FIG. 2, the path created between the electrode extension 88 and the housing 14 is generally a serpentine path extending along the outer surface 32 of the inner insulator 24 and along the inner and outer surfaces 64, 58 of the outer insulator 54, with a portion of the path extending across the ports 74 in the lower shoulder 66. As such, the ability of the carbon to form a continuous path between the electrode extension 88 and the housing 14 is hampered. To further inhibit formation of a deposited carbon layer, pressurized air is emitted outwardly from the ports 74 to facilitate cleansing away any carbon residue from between the inner surface 64 of the outer insulator 54 and the outer surface 32 of the inner insulator 24.

In use an electric current is provided to the spark electrode assembly. 10 and through the electrode 78. The current seeks ground through the path of least resistance, and thus, arcs across the gap 96 defined between the end 90 of the electrode extension 88 and the end 92 of the ground element 94. The arcing electricity creates a spark and ignites the combustible gas mixture provided through the nozzle 22 into the cavity 20 of the glass mold, thereby causing a film of carbonaceous material to be deposited on the glassware mold surface within the glass mold.

It should be recognized that upon reading the disclosure herein, one originally skilled in the art of glass forming would readily recognize other embodiments than those disclosed herein, with those embodiments being within the scope of the claims that follow. Accordingly, this disclosure herein is intended to be exemplary, and not limiting. The scope of the invention is defined by the claims that follow.

The invention claimed is:

1. A spark electrode assembly for igniting a combustible gas to lubricate a glassware mold surface, comprising:
   an electrode,
   an inner insulator surrounding at least in part said electrode for mounting said electrode to a support structure with an end of said electrode being disposed relative to one side of said support structure for attachment to a source of electrical power and another end of said electrode being positioned adjacent to a ground element across a spark gap, and
   an outer insulator surrounding at least in part and spaced from said inner insulator adjacent to said another end of said electrode to inhibit electrical leakage from said electrode to the support structure by providing an open space between said inner and outer insulators,
   said inner insulator having an outer surface with an enlarged mid-section extending radially outwardly from said outer surface, said mid-section having upper and lower portions axially spaced from one another to define at least in part an air passage in said inner insulator.

2. The assembly of claim 1 wherein said inner and outer insulators include aligned air passages coupled to said air passage in said inner insulator for feeding purge air to said space between said inner and outer insulators.

3. The assembly of claim 2 wherein said inner and outer insulators include outwardly extending flanges and said assembly further includes a retainer mounting said flanges in mating engagement with one another.

4. The assembly of claim 2 wherein said outer insulator includes a radially inwardly extending shoulder with said air passages in said outer insulator extending axially through said shoulder.

5. The assembly of claim of claim 1 wherein said mid-section has a radially inwardly extending groove defining at least in part said upper and lower portions.

6. The assembly of claim 1 wherein said lower portion has a plurality of ports extending axially therethrough defining at least in part said air passage in said inner insulator.

7. The assembly of claim 6 wherein said ports are spaced circumferentially from one another.

8. A spark electrode assembly for igniting a combustible gas to lubricate a glassware mold surface, comprising:
   an electrode,
   an inner insulator having a passage in which at least a portion of said electrode is received and an outer surface facilitating mounting said spark electrode assembly to a support structure with an end of said electrode being disposed relative to one side of the support structure for attachment to a source of electrical power and another end of said electrode being positioned adjacent to a ground element across a spark gap, and
   an outer insulator having an inner surface spaced radially outwardly from said outer surface of said inner insulator defining a generally serpentine path between said end of said electrode adjacent said ground element and said support structure to inhibit electrical leakage between said electrode and the support structure, said inner insulator has an upper and lower portion axially spaced from one another by an annular groove to define at least in part an air passage in said inner insulator.

9. The assembly of claim 8 wherein said lower portion has a plurality of ports extending therethrough defining at least in part said air passage in said inner insulator.

10. The assembly of claim 9 wherein said outer insulator includes a radially inwardly extending shoulder having at least one air passage extending through said shoulder.

11. The assembly of claim 10 wherein said at least one air passage in said outer insulator is arranged in axial alignment with said ports in said inner insulator.

12. The assembly of claim 8 wherein said serpentine path is defined at least in part by said outer surface of said inner insulator and said inner and outer surfaces of said outer insulator.

* * * * *